United States Patent [19]

Stevenson

[11] Patent Number: 5,604,989
[45] Date of Patent: Feb. 25, 1997

[54] SHOTGUN BARREL BORE CHECKING GAUGE

[76] Inventor: Kim E. Stevenson, 11268 Hickory Dale Dr., Boise, Id. 83713

[21] Appl. No.: 418,781

[22] Filed: Apr. 6, 1995

[51] Int. Cl.⁶ .................................................. G01B 3/46
[52] U.S. Cl. ................................................................ 33/506
[58] Field of Search ............................ 33/506, 555.1, 33/544.4, 542, 514.1, 555.2

[56] References Cited

U.S. PATENT DOCUMENTS

| | | | |
|---|---|---|---|
| 69,954 | 10/1867 | Richards | 33/544.4 |
| 343,582 | 6/1886 | Harwood | 33/544.4 |
| 1,264,519 | 4/1918 | Hinson | 33/555.1 |
| 4,129,950 | 12/1978 | Weinhaus et al. | 33/600 |
| 4,348,812 | 9/1982 | Middleton | 33/506 |
| 5,199,180 | 4/1993 | Yablonsky | 33/501.45 |
| 5,253,427 | 10/1993 | Bartlett | 33/501.45 |
| 5,353,513 | 10/1994 | Round | 33/555.2 |

*Primary Examiner*—Thomas B. Will
*Attorney, Agent, or Firm*—Frank J. Dykas

[57] ABSTRACT

A thin, flat gauge for determining the size of the bore of a shotgun, the gauge having a width, the dimension of which is stepped, the width of the steps decreasing from the top of the gauge to the bottom. Alternatively, the gauge may be tapered from wider at the top of the gauge to narrower near the bottom. Lettering and numbering indicating bore diameter are silk screened, etched or otherwise inscribed on the gauge.

16 Claims, 4 Drawing Sheets

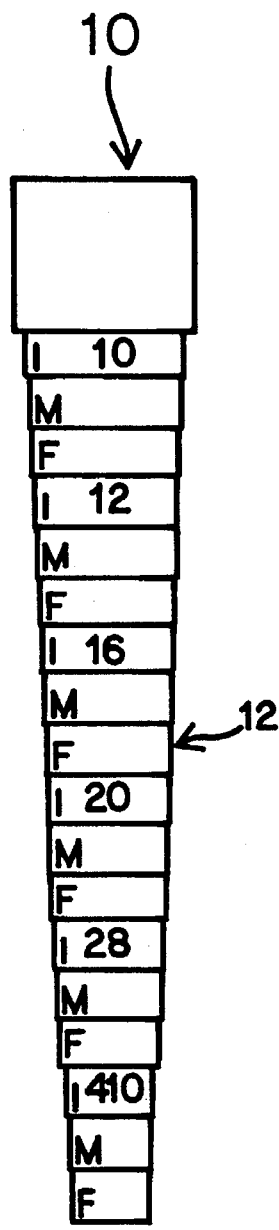
FIG. 2  FIG. 3
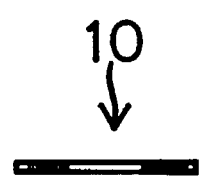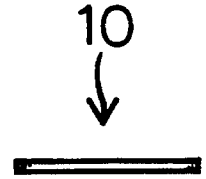
FIG. 4  FIG. 5

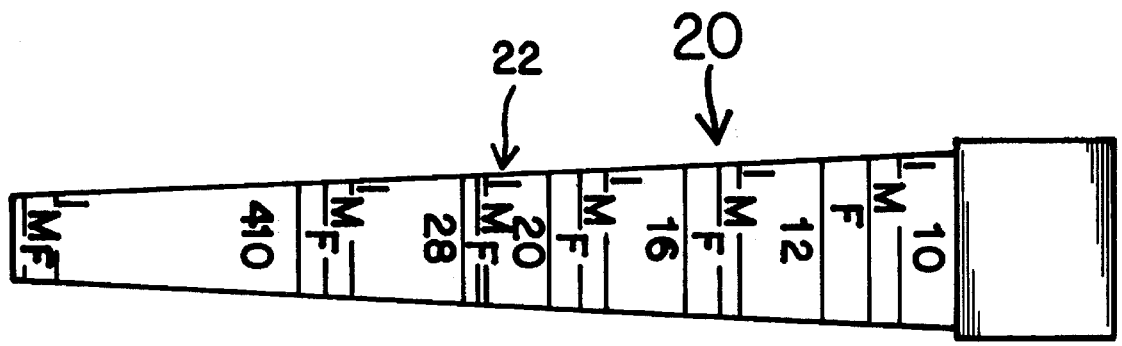
FIG. 7
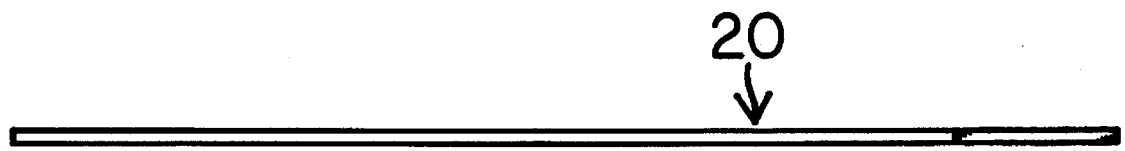
FIG. 8
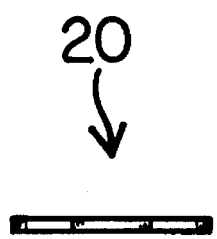 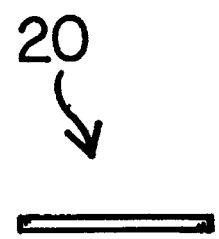
FIG. 9  FIG. 10

SHOTGUN BARREL BORE CHECKING GAUGE

BACKGROUND OF THE INVENTION

Technical Field. This invention relates to measuring devices, and more particularly to a gauge for checking the diameter of the bore of a shotgun barrel.

Background: Shotguns come in a variety of sizes, the size being determined by the bore of the barrel. Commonly available shotgun sizes include the 10 gauge, the 12 gauge, the 16 gauge, the 20 gauge, the 28 gauge and a 410. Historically, each of these gauges corresponded to the barrel diameter determined by the diameter of a ball of lead weighing a predetermined amount. In the case of a 10-gauge, the barrel diameter or bore corresponded to a ball of lead weighing one-tenth of a pound. Similarly, the barrel diameter of a 12-gauge corresponded to the diameter of a ball of lead weighing one-twelfth of a pound, and so on. The barrel diameter of a .410 shotgun corresponded to the barrel diameter determined by the diameter of a ball of lead weighing one fortieth of a pound.

Over time, a variety of modifications have been standardized, as can be seen in Table 1.

TABLE 1

TABLE OF SHOTGUN BORE CONSTRICTIONS

| GAUGE | 10 | 12 | 16 | 20 | 28 | 410 |
|---|---|---|---|---|---|---|
| | NEW AMERICAN STANDARD | | | | | |
| NOMINAL BORE DIAMETER | 0.779 | 0.729 | 0.667 | 0.617 | 0.550 | 0.410 |
| CYLINDER | 0.000 | 0.000 | 0.000 | 0.000 | 0.000 | 0.000 |
| SKEET I | 0.005 | 0.005 | 0.004 | 0.004 | 0.003 | 0.002 |
| IMPROVED CYLINDER | 0.010 | 0.009 | 0.007 | 0.006 | 0.005 | 0.004 |
| SKEET II | 0.015 | 0.012 | 0.010 | 0.009 | 0.007 | 0.006 |
| MODIFIED | 0.020 | 0.019 | 0.015 | 0.014 | 0.012 | 0.008 |
| IMPROVED MODIFIED | 0.025 | 0.025 | 0.020 | 0.019 | 0.016 | 0.011 |
| FULL CHOKE | 0.035 | 0.035 | 0.028 | 0.025 | 0.022 | 0.015 |
| EXTRA FULL | 0.040 | 0.040 | 0.035 | 0.027 | 0.024 | 0.021 |

Gunsmiths are frequently asked to make modifications to existing barrels for a variety of reasons including age of the gun and enhancement of performance. As a result, a wide variety of actual barrel sizes may be identified by any of the several common nominal bore diameters.

A similar variety of sizings as those shown above at Table 1 are also recognized by the Old American Standard and the New European Standard, although the variation for any given choke for these other recognized standards will vary from those recognized by the New American Standard. See Table 2 and Table 3.

TABLE 2

TABLE OF SHOTGUN BORE CONSTRICTIONS

| GAUGE | 10 | 12 | 16 | 20 | 28 | 410 |
|---|---|---|---|---|---|---|
| | OLD AMERICAN STANDARD | | | | | |
| NOMINAL BORE DIAMETER | 0.775 | 0.725 | 0.662 | 0.615 | 0.550 | 0.410 |
| CYLINDER | 0.000 | 0.000 | 0.000 | 0.000 | 0.000 | 0.000 |
| SKEET I | 0.004 | 0.003 | 0.003 | 0.002 | 0.002 | 0.001 |
| IMPROVED CYLINDER | 0.007 | 0.006 | 0.005 | 0.004 | 0.003 | 0.002 |
| SKEET II | 0.012 | 0.011 | 0.009 | 0.007 | 0.006 | 0.004 |
| MODIFIED | 0.016 | 0.015 | 0.012 | 0.010 | 0.008 | 0.005 |
| IMPROVED MODIFIED | 0.025 | 0.023 | 0.018 | 0.016 | 0.013 | 0.010 |
| FULL CHOKE | 0.035 | 0.030 | 0.024 | 0.021 | 0.017 | 0.014 |
| EXTRA FULL | 0.040 | 0.035 | 0.032 | 0.025 | 0.023 | 0.020 |

TABLE 3

TABLE OF SHOTGUN BORE CONSTRICTIONS

| GAUGE | 10 | 12 | 16 | 20 | 28 | 410 |
|---|---|---|---|---|---|---|
| | NEW EUROPEAN STANDARD | | | | | |
| NOMINAL BORE DIAMETER | 0.780 | 0.730 | 0.673 | 0.619 | 0.544 | 0.415 |
| CYLINDER | 0.000 | 0.000 | 0.000 | 0.000 | 0.000 | 0.000 |
| SKEET I | 0.005 | 0.005 | 0.004 | 0.003 | 0.004 | 0.005 |
| IMPROVED CYLINDER | 0.010 | 0.010 | 0.008 | 0.006 | 0.008 | 0.010 |
| SKEET II | 0.015 | 0.015 | 0.012 | 0.011 | 0.012 | 0.016 |
| MODIFIED | 0.020 | 0.020 | 0.017 | 0.015 | 0.016 | 0.022 |
| IMPROVED MODIFIED | 0.025 | 0.025 | 0.025 | 0.022 | 0.022 | 0.028 |
| FULL CHOKE | 0.035 | 0.035 | 0.033 | 0.029 | 0.028 | 0.034 |
| EXTRA FULL | 0.040 | 0.040 | 0.040 | 0.031 | 0.032 | 0.035 |

What is needed is a simple gauge which would allow dealers and collectors of used arms to easily identify the size of the bore of any given shotgun. The object, then, of the present invention is to provide such a gauge.

This objective is met by a flat gauge having a tapered width, the gauge having inscribed or etched on one face markings which would allow the user to identify the bore of a given shotgun. These gauges would be made available in any of the recognized standards including the New American Standard, the Old American Standard and the New European Standard.

Another objective of the present invention would be to provide a gauge which is simple and inexpensive to manufacture.

DISCLOSURE OF INVENTION

These objects are accomplished by a thin, flat gauge stamped preferably from 25 or 26-gauge stainless steel strip material. The strip material is stamped so as to have a width, the dimension of which is stepped, the width of the steps decreasing from the top of the gauge to the bottom. Alternatively, the gauge may be tapered from wider at the top of the gauge to narrower near the bottom. Lettering and numbering indicating bore are silk screened, etched or otherwise inscribed on the gauge.

BRIEF DESCRIPTION OF THE DRAWINGS

FIG. 2 is a first side view of the Shotgun Barrel Bore Checking Gauge.

FIG. 3 is a second side view of the Shotgun Barrel Bore Checking Gauge.

FIG. 4 is a bottom view of the Shotgun Barrel Bore Checking Gauge.

FIG. 5 is a top view of the Shotgun Barrel Bore Checking Gauge.

FIG. 7 is a first side view of an alternative embodiment of the Shotgun Barrel Bore Checking Gauge.

FIG. 8 is a second side view of an alternative embodiment of the Shotgun Barrel Bore Checking Gauge.

FIG. 9 is a bottom view of an alternative embodiment of the Shotgun Barrel Bore Checking Gauge.

FIG. 10 is a top view of an alternative embodiment of the Shotgun Barrel Bore Checking Gauge.

BEST MODE FOR CARRYING OUT INVENTION

Figure 1:
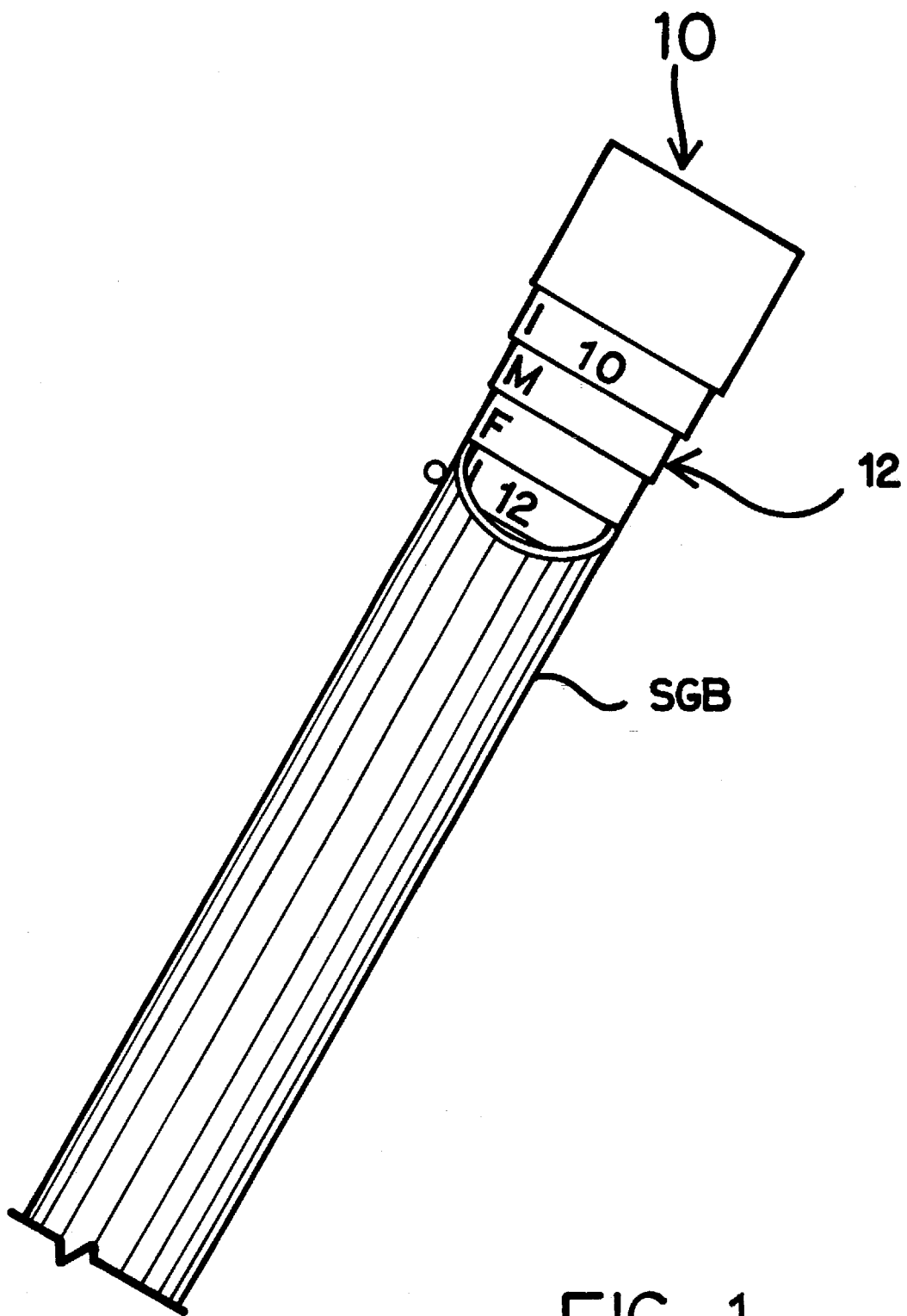
FIG. 1 is a perspective view of the Shotgun Barrel Bore Checking Gauge inserted into a shotgun barrel.

Referring now to FIGS. 1 through 10, the best mode of the shotgun barrel bore checking gauges is shown to advantage. FIG. 1 shows the gauge 10 inserted in shotgun barrel SGB. FIG. 2 shows to advantage the stepped edge 12 of gauge 10. FIG. 3 shows a side view of gauge 10. FIG. 4 shows a bottom view of gauge 10. FIG. 5 shows a top view of gauge 10.

Figure 6:
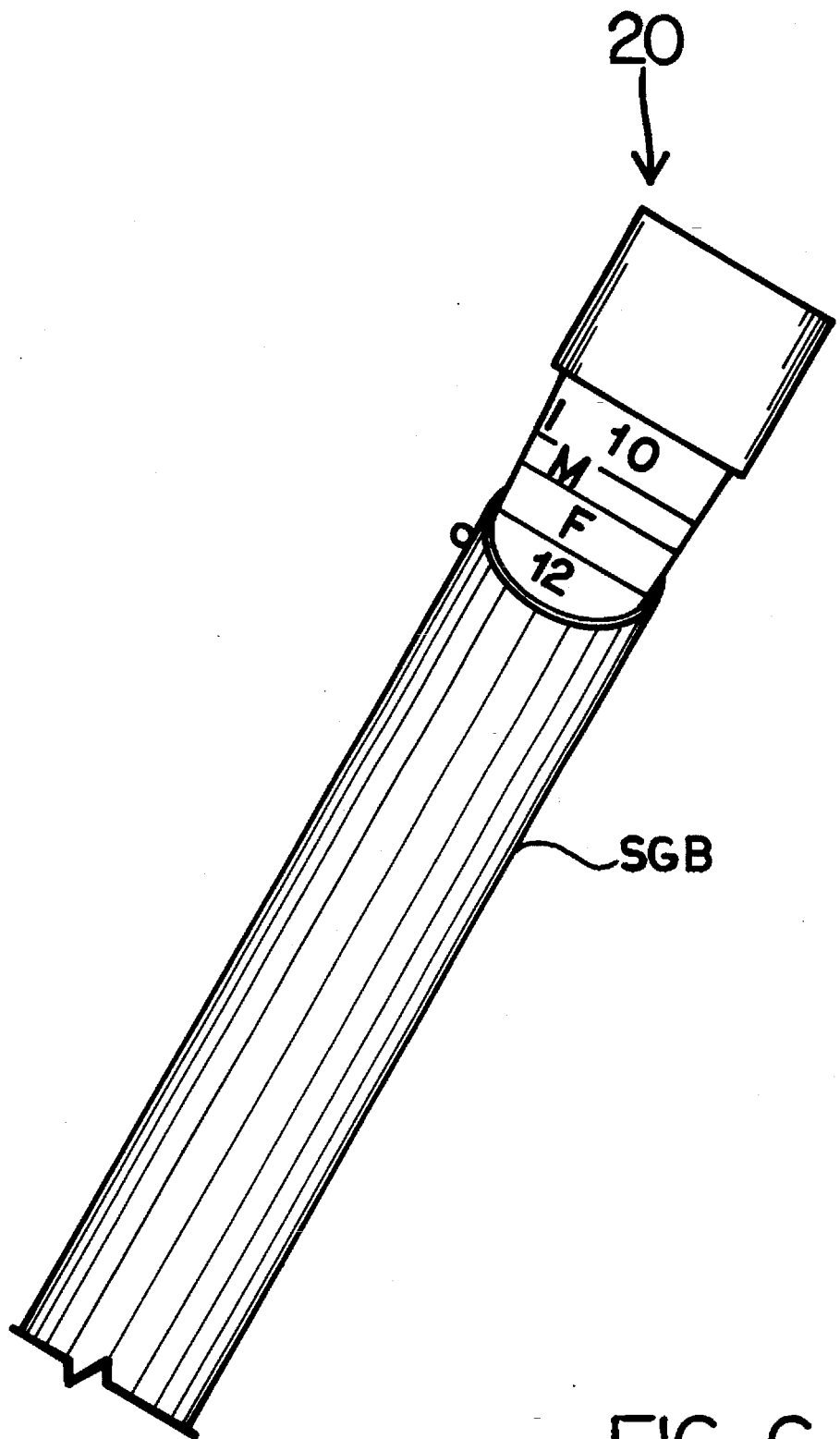
FIG. 6 is a perspective view of an alternative embodiment of the Shotgun Barrel Bore Checking Gauge.

Similarly, FIG. 6 shows an alternative embodiment of Shotgun Barrel Bore Checking Gauge. FIG. 6 shows gauge 20 having tapered edge 22. FIG. 7 shows a first side view of gauge 20. FIG. 8 shows a second side view of gauge 20. FIG. 9 shows a bottom view of gauge 20. FIG. 10 shows a top view of gauge 20.

In operation, the Shotgun Barrel Bore Checking Gauge is simply inserted into the barrel of a shotgun as far as the gauge can be inserted, see FIGS. 1 and 6. If the stepped gauge is being used, a line associated with or corresponding to the step will indicate the barrel bore. If a tapered gauge is being used, a line corresponding to the depth to which the gauge has been inserted in the barrel will indicate the bore of the barrel.

While there is shown and described the present preferred embodiment of the invention, it is to be distinctly understood that this invention is not limited thereto but may be variously embodied to practice within the scope of the following claims.

I claim:

1. A gauge for determining the diameter of a bore of a shotgun barrel comprising a flat bar member having first and second ends, a predetermined length, a predetermined width, a predetermined thickness and first and second edges, the flat bar member having a stepped configuration along the first and second edges such that the width of the flat bar member varies along its length, the variations in the width of the gauge corresponding to the variations in the bore of different shotgun barrels.

2. The gauge for determining the diameter of a bore of a shotgun barrel of claim 1 further comprising a series of markings corresponding to the variations in the width of the gauge, said markings indicating the size of the bore of the shotgun barrel having a diameter equal to the width of the gauge at any given step along the length of the gauge.

3. The gauge for determining the diameter of a bore of a shotgun barrel of claim 1 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters as established by the Old American Standard.

4. The gauge for determining the diameter of a bore of a shotgun barrel of claim 1 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters as established by the New American Standard.

5. The gauge for determining the diameter of a bore of a shotgun barrel of claim 1 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters as established by the New European Standard.

6. The gauge for determining the diameter of a bore of a shotgun barrel of claim 3 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters for shotgun bores ranging from a 10 gauge improved bore to a 410 full bore.

7. The gauge for determining the diameter of a bore of a shotgun barrel of claim 4 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters for shotgun bores ranging from a 10 gauge improved bore to a 410 full bore.

8. The gauge for determining the diameter of a bore of a shotgun barrel of claim 5 further comprising a series of markings corresponding to the variations in the width of the gauge, said markings indicating the size of the bore of the shotgun barrel having a diameter equal to the width of the gauge at any given step along the length of the gauge said markings corresponding to the nominal bore diameters for shotgun bores ranging from a 10 gauge improved bore to a 410 full bore.

9. A gauge for determining the diameter of a bore of a shotgun barrel comprising a flat bar member having first and second ends, a predetermined length and first and second edges, the flat bar member having a tapered width from the first end to the second end such that the width of the flat bar member varies along its length, the variations in the width of the gauge corresponding to the variations in the bore of different shotgun barrels.

10. The gauge for determining the diameter of a bore of a shotgun barrel of claim 9 further comprising a series of markings corresponding to the variations in the width of the gauge, said markings indicating the size of the bore of the shotgun barrel having a diameter equal to the width of the gauge at any given marking along the length of the gauge.

11. The gauge for determining the diameter of a bore of a shotgun barrel of claim 9 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters as established by the Old American Standard.

12. The gauge for determining the diameter of a bore of a shotgun barrel of claim 9 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters as established by the New American Standard.

13. The gauge for determining the diameter of a bore of a shotgun barrel of claim 9 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters as established by the New European Standard.

14. The gauge for determining the diameter of a bore of a shotgun barrel of claim 11 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters for shotgun bores ranging from a 10 gauge improved bore to a 410 full bore.

15. The gauge for determining the diameter of a bore of a shotgun barrel of claim 12 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters for shotgun bores ranging from a 10 gauge improved bore to a 410 full bore.

16. The gauge for determining the diameter of a bore of a shotgun barrel of claim 13 further comprising a series of markings corresponding to the variations in the width of the gauge, said markings indicating the size of the bore of the shotgun barrel having a diameter equal to the width of the gauge at any given marking along the length of the gauge said markings corresponding to the nominal bore diameters for shotgun bores ranging from a 10 gauge improved bore to a 410 full bore.

* * * * *